United States Patent [19]
Esser

[11] Patent Number: 5,839,340
[45] Date of Patent: Nov. 24, 1998

[54] APPARATUS FOR CUTTING TUBES

[75] Inventor: Karl-Josef Esser, Mönchengladbach, Germany

[73] Assignee: Mannesmann Aktiengesellschaft, Düsseldorf, Germany

[21] Appl. No.: 787,937

[22] Filed: Jan. 23, 1997

[30] Foreign Application Priority Data

Jan. 31, 1996 [DE] Germany ............... 196 05 021.9

[51] Int. Cl.⁶ ........................................ B26D 1/11
[52] U.S. Cl. .................... 83/483; 83/485; 82/59
[58] Field of Search ............... 83/54, 483, 485; 82/59

[56] References Cited

U.S. PATENT DOCUMENTS

| | | | |
|---|---|---|---|
| 1,306,588 | 6/1919 | France ........................... | 82/59 |
| 3,129,621 | 4/1964 | Makowski ..................... | 82/59 |
| 3,442,175 | 5/1969 | Heap et al. ................... | 29/26 R X |
| 3,557,649 | 1/1971 | Kirchner ...................... | 83/54 |
| 4,111,346 | 9/1978 | Bertolette ..................... | 82/59 X |
| 4,419,806 | 12/1983 | Esser ............................ | 483/44 |
| 4,447,178 | 5/1984 | Esser ............................ | 409/80 |
| 4,488,467 | 12/1984 | Hegler et al. ................ | 83/54 X |
| 4,517,868 | 5/1985 | Leloux ......................... | 83/54 |
| 4,833,770 | 5/1989 | Esser et al. .................. | 483/41 |
| 4,890,969 | 1/1990 | Esser ............................ | 483/37 |
| 4,905,552 | 3/1990 | Shinbori ....................... | 82/59 X |
| 4,987,808 | 1/1991 | Sicka et al. .................. | 83/54 X |
| 5,240,360 | 8/1993 | Esser ............................ | 409/230 |
| 5,586,476 | 12/1996 | Esser ............................ | 82/127 X |
| 5,662,524 | 9/1997 | Esser et al. .................. | 408/153 X |

FOREIGN PATENT DOCUMENTS

| | | | |
|---|---|---|---|
| 1569063 | 3/1969 | France ........................... | 83/54 |
| 41 01 749 C2 | 7/1991 | Germany . | |
| 44 22 935 A1 | 1/1996 | Germany . | |
| 52-39879 | 3/1977 | Japan ............................ | 83/54 |
| 54-44288 | 4/1979 | Japan ............................ | 83/54 |
| 659297 | 4/1977 | U.S.S.R. ...................... | 83/54 |
| 761168 | 9/1980 | U.S.S.R. ...................... | 83/54 |

*Primary Examiner*—Maurina T. Rachuba
*Attorney, Agent, or Firm*—Cohen, Pontani, Lieberman & Pavane

[57] ABSTRACT

A machine for cutting a tube having a frame encompassing the tube on which supports are conducted and moveable in two vertically stacked axial directions on a plane running at a right angle to the tube longitudinal axis. At least two supports are driven exclusively in a single axial direction during the cutting process. A cutting head is mounted on each support, each cutting head having a disk milling cutter attached thereto. The disk milling cutters, which are rotary driven on a common cutting plane, simultaneously cut through the tube as the result of controlled movement of the supports in their axial directions. The disk milling cutters, moving in the same direction relative to the circumference of the tube, i.e. clockwise or counter-clockwise, simultaneously cut a section of the wall cross-sectional area of the tube. The machine also has clamping devices arranged in the vicinity of the disk milling cutters to secure the tube in place during the cutting process.

11 Claims, 4 Drawing Sheets

APPARATUS FOR CUTTING TUBES

BACKGROUND OF THE INVENTION

1. Field of the Invention

The present invention relates to an apparatus for cutting tubes, and more particularly to a machine for cutting tubes which has a machine frame having a plurality of supports stacked in two vertically axial directions that encompass the tube.

2. Description of the Related Art

German Patent DE 41 01 749 C2 describes a machine for cutting steel tubes having multiple cutting heads equipped with disk milling cutters that rotate about the tube in the same direction, i.e. clockwise or counter-clockwise. The disk milling cutters are mounted on pivot arms, which in turn are mounted on a rotary ring. Drive units for the rotary ring cause the disk milling cutters to rotate around the central axis of the tube to be cut. The disk milling cutters may be adjusted by swinging the pivot arms, thereby setting and controlling the linear movement of the disk milling cutters in the longitudinal direction of the tube axis. When cutting tubes having large square profiles, however, the disk milling cutters must be lowered in a controlled fashion and radially adjusted via a rotational angle to compensate for tubes of various radii and cross-sections. As a result, and due in part to the fact that the disk milling cutters move in a non-linear manner about the tube, complicated controls are required to maintain a constant cutting speed. In addition, the drive system for the rotary ring cannot be prestressed, limiting the processing quality of the machine. Furthermore, the drives required to produce rotary and linear motions and the need to readjust the disk milling cutters to cut rectangular and square profile tubes yield an expensive machine that is limited in its ability to cut tubes having a variety of sizes and profiles.

German Patent DE 41 01 749 describes a machine for cutting tubes having two cutting heads each having a disk milling cutter mounted thereon. Each cutting head is carried by a separate guide device which is movable in two orthogonal directions. The orthogonal directions run opposite to one another in pairs relative to the central longitudinal axis of the machine. Each cutting head has two drive motors to individually control the speed and movement of the cutting head in the two orthogonal directions, i.e. a separate motor for each of the two orthogonal directions for a total of four motors. It is thereby possible to separately move the cutting heads in the vertical and horizontal directions and in directions superimposed on these two directions, i.e. non-linear directions. However, by using only two disk milling cutters, the cutting speed of this machine is limited.

SUMMARY OF THE INVENTION

It is accordingly an object of the present invention to provide an inexpensive, compact and modular machine for cutting tubes of various sizes and cross-sectional profiles which is easily adaptable to a variety of cutting conditions.

The tube cutting machine of the present invention comprises a three-dimensional frame having a substantially polygonal cross-section which encompasses the tube and which carries a plurality of straight guide strips. At least three supports, stacked in two vertically axial directions on the frame, i.e. in a substantially horizontal and a substantially vertical direction, are carried by the guide strips for linear movement thereon. The supports are each moveable linearly along the guide strips at right angles to each other on a plane which runs at a right angle to the longitudinal axis of the tube. At least two supports are moveable exclusively in a single direction, i.e. in only the horizontal or vertical direction, during the cutting process.

Mounted on each support is a cutting head having a disk milling cutter attached thereto. The disk milling cutters are driven by separate motors in a rotary fashion to simultaneously cut through the tube via the controlled linear movement of the supports. The disk milling cutters move in the same circumferential direction, i.e. either generally clockwise or counter-clockwise, and at right angles to one another, as they cut the tube.

The supports are separately adjustable in a first axial direction generally inward toward the tube. This adjustment is at a right angle to the linear movement direction of idle support and sets the cutting depth for each disk milling cutter.

The supports and corresponding disk milling cutters may be synchronously driven along the guide strips by linear advance motors. In this way, each support and disk milling cutter cuts through the tube at precisely the same time, resulting in greater control over the cutting speed and improved overall cutting quality.

A plurality of linear advance drive motors may be provided for moving the supports in the cutting advance direction. Linear movement of the supports is provided by a threaded rod connected to a linear advance motor. A complementary threaded piece is provided on each support to impart the linear drive movement from the advance motor to the support. Alternatively, a single linear advance drive motor may be provided for all supports or for groups of supports, thereby synchronizing movement of the supports in the cutting advance direction.

Pairs of linear advance drive motors may be linked synchronously to precisely adjustment the drive motors and corresponding supports. This reduces the number of linear drive motors required. As a result, the linear advance drive motors and supports may be precisely adjusted, thereby increasing the cutting quality of the machine without a coincident increase in expense.

A space is maintained between all of the disk milling cutters as they cut the tube which makes it possible to use cutting heads and disk milling cutters of many different sizes in an extremely small space and to simultaneously cut a tube at four circumferential locations by means of the simultaneous linear movement of the disk milling cutters. Four disk milling cutters may thus be arranged around the tube and can cut the tube without colliding with one another. As a result, a variety of sizes of disk milling cutters may be used on the same cutting machine. By driving the supports along linear guide strips using linear drive motors it is possible to provide a simple and rigid tube cutting apparatus that is significantly free of play.

A tube cutting machine configured in accordance with the present invention for cutting tubes having triangular profiles comprises a plurality of straight guide strips carried on a frame which encompasses the tube. Three supports, stacked in two vertically axial directions on the frame, i.e. in a substantially horizontal and a substantially vertical direction, are carried by the guide strips for linear movement thereon. The supports are each moveable linearly along the guide strips at right angles to each other on a plane which runs at a right angle to the longitudinal axis of the tube. The supports are separately adjustable in a first axial direction generally inward toward the tube. A plurality of linear advance drive motors are provided for moving the supports in the second axial or cutting advance direction.

Mounted on each support is a cutting head having a disk milling cutter attached thereto. The disk milling cutters move in the same circumferential direction, i.e. either generally clockwise or counter-clockwise, and at right angles to one another, as they move in the second axial direction and cut the tube. The second axial direction of at least two adjacent supports run toward each other in clockwise or counter-clockwise fashion at right angles to one another. The third support can be moved on a path deviating from a straight line by means of temporary superimposition of its simultaneous movement in both the vertical and horizontal directions. Consequently, a tube having a triangular profile may be cut by two supports that move in a straight line and at a right angle to one another and a third support that follows the contour of the cross-section of the tube.

A tube cutting machine of the present invention, configured for cutting tubes having round or triangular profiles, comprises a plurality of straight guide strips carried on a generally triangular frame which encompasses the tube. Three supports are carried by the guide strips for linear movement thereon.

Mounted on each support is a cutting head having a disk milling cutter attached thereto. The supports are separately adjustable in a first axial direction generally inward toward the tube. The disk milling cutters move toward each other at an acute angle in the said circumferential direction, i.e. either generally clockwise or counter-clockwise, as they cut the tube. A single linear advance drive motor is provided for synchronously moving the supports in the second axial direction.

In each of the aforementioned embodiments, a single linear advance drive motor may be provided for all supports thereby synchronizing the movement of the supports in the second axial or cutting advance direction. It is thus possible to move two or three supports in the second axial direction— or even all four supports, in the case of smaller dimensions—in a straight line with a single drive motor. A coupling mechanism, in the form of a plurality of threaded rods having bevel gear teeth affixed to the opposite ends thereof, may be used to couple the plurality of supports for synchronous movement in the second axial direction.

It is especially important that the frame of the present invention be compact and modular to allow a variety of supports to be used. In contrast to previous designs, in which special columnar guides were provided for the supports movable in orthogonal directions, the frame of the present invention can be produced as a self-contained three-dimensional unit having a substantially polygonal cross-section. The present frame also comprises a recess in its center for the tube and carries universal guides for the supports frontally on its circumference. The guide strips are all of the same design, so that the supports are interchangeable among themselves and can be individually removed and added. This is of particular interest when the machine operator wants to change the dimensions of the profile to be cut. An adjustment can then be carried out, for example, by converting a machine with three supports into one with four supports or vice versa. Of course, operation with two supports or one support is also possible.

Just as the supports on the frame can be easily exchanged, the cutter heads and/or disk milling cutters can also be attached to the supports in an easily exchangeable manner. As a result, disk milling cutters for different tube profiles and cross-sections can be exchanged quickly and easily. It is thereby possible to cut a larger program of tube profiles with the same tube cutting machine. The frame according to the present invention also locates the stress points for the tube to be cut inside the frame.

The advantages of the present invention include, firstly, the ability to process tubes with four disk milling cutters simultaneously using a very simple machine and tool guidance system. Furthermore, the interchangeability of th processing situation for a variety of tube profile cross-sections. Refitting a machine with additional cutter heads to satisfy a customer request, e.g. when the program of tubes to be cut has been changed, is easily possible. A tube can be processed with two disk milling cutters or with three or four disk milling cutters, because the movement according to the invention of the supports on straight guide strips means that a plurality of very closely arranged disk milling cutters can cut a tube without interfering with each other. It is also possible to easily exchange the complete cutting heads for special requirements. In its basic version, the machine and the permits processing of a tube with three disk milling cutters, whereby two disk milling cutters are moved simultaneously on two guide strips at right angles to one another and the third disk cutter is moved at the same time on a non-linear path on both the X and Y axes, i.e. following the profile of the tube to be cut. Using a few constructive sizes of the basic machine and the same modules, it is possible to carry out the same tube program which, in the prior art with two disk milling cutters, required multiple machine types at correspondingly lower productivity. The machine according to the present invention is advantageously adaptable for cutting tubes having cross-sections of various sizes, including tubes having square, circular, rectangular and triangular profiles.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein lie reference characters denote similar elements throughout the several views.

DETAILED DESCRIPTION OF THE PRESENTLY PREFERRED EMBODIMENTS

Figure 1:
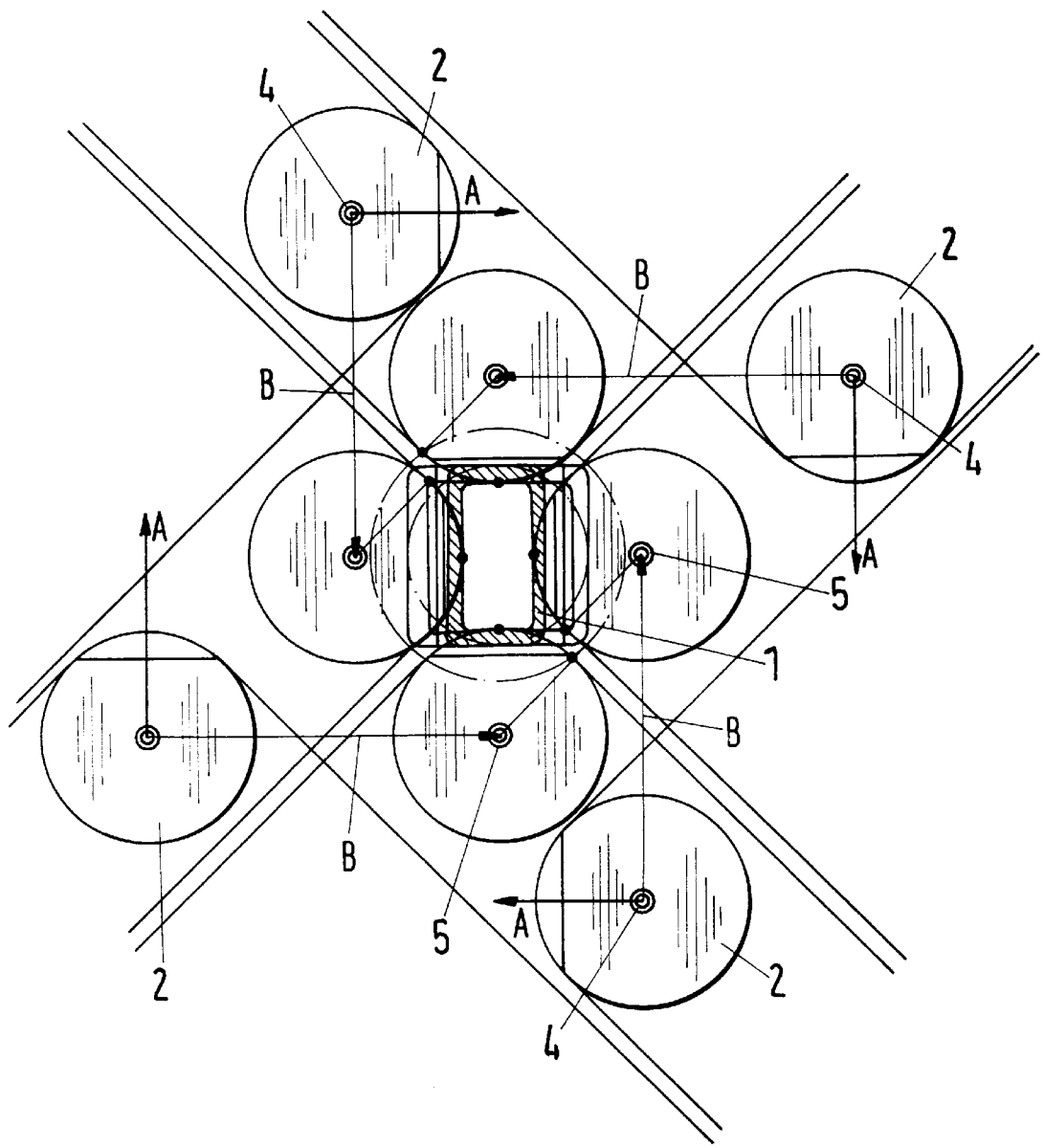
FIG. 1 is a conceptional view of a machine for cutting tubes according to the present invention showing the disk milling cutters in the resting position and in the cutting position.

Referring now to the drawings, FIG. 1 schematically depicts the general structure of a machine for cutting tubes according to the present invention. A plurality of separately rotatable disk milling cutters 2 are arranged in an extremely small area about a tube 1. Individual disk milling cutters 2 are adjustable in a first axial direction generally inward toward the tube, indicated by arrow A, and at right angles to their movement paths, indicated by arrow B. This adjustment varies the cutting depth of the disk milling cutters 2. The disk milling cutters 2 are moveable from a resting position, indicated by reference number 4, along linear movement paths B in a second axial or cutting advance direction and into a cutting position, indicated by reference number 5, during cutting of the tube 1. When moved in the cutting advance direction, the disk milling cutters 2 move axially and at right angles to one another. Axial movement of the disk milling cutters 2 in the cutting advance direction is synchronized, at least for pairs of disk milling cutters 2. A space is maintained between and among the disk milling cutters 2 as they are moved in the cutting advance direction, i.e. into and out of the cutting position 5, making it possible for four disk milling cutters 2 to cut the tube 1 and to move into and out of the cutting area without coming into contact with one another.

Figure 2:
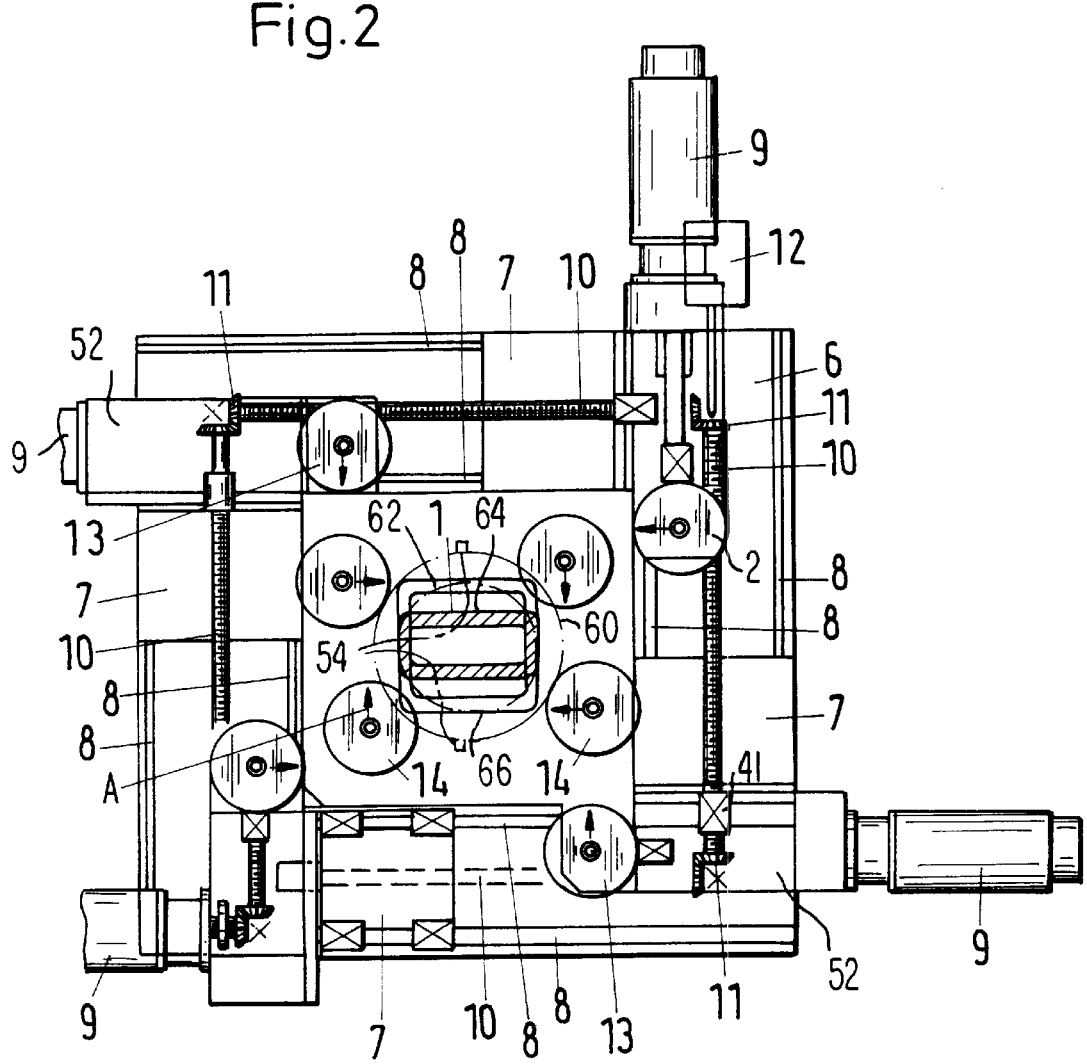
FIG. 2 is a view of a machine for cutting tubes having four disk milling cutters and configured in accordance with the present invention.

Referring next to FIG. 2, a machine for cutting tubes configured in accordance with the present invention is shown in schematic fashion and described below. A frame 6 encompasses the tube 1 and carries a plurality of guide strips 8. Four supports 7, stacked in I.vo vertically axial directions on the frame 6, i.e. in a substantially horizontal and a substantially vertical direction, are carried by the guide strips 8 for linear movement thereon. The supports 7 are moveable along the guide strips 8 at right angles to each other on a plane that runs at a right angle to the longitudinal axis of the tube 1.

Each support 7 carries a cutting head 52 having a disk milling cutter 2 attached thereto. Each disk milling cutter 2 is separately driveable radially via a drive motor 9. Each disk milling cutter 2 is also separately adjustable in a first axial direction generally inward toward the tube 1. This adjustment sets the cutting depth of the disk milling cutter 2 through the tube 1.

The supports 7 and corresponding disk milling cutters 2 can be moved synchronously in a second axial direction at right angles to one another by a single linear advance motor 12. Each support 7 moves in a single axial direction during the cutting process, i.e in a substantially horizontal or vertical direction.

A plurality of threaded rods 10 are provided to transfer the rotational movement of the linear advance motor 12 to the linear movement of the supports 7 along the guide stips 8. Each support 7 has a threaded piece 41 which threadedly engages the threaded rod 10. Each threaded rod 10 has a bevel gear 11 provided at its opposite ends. Each bevel gear 11 threadedly engages a bevel gear 11 connected to another threaded rod 11 thereby connecting the plurality of threaded rods 10 to each other in a serially geometric manner so that rotational movement of a single threaded rod 10 will impart corresponding rotational movement to the remaining threaded rods 10. Consequently, a single linear advance motor 12 connected to one of the plurality of threaded rods 10 will transfer the rotational movement of the motor 12 to synchronized linear movement of the supports 7.

In an alternative embodiment, two, three or four linear advance motors 12 may be provided to separately move the supports 7 in the second axial direction. In this embodiment, pairs of the linear advance drive motors 12 are linked to synchronously drive the supports 7 linearly along the guide strips 8 in the second axial or cutting advance direction.

FIG. 2 shows the disk milling cutters 2 in the initial position 13, i.e. outside of the interior profile of the frame 6, on the one hand, and in the starting position 14 for cutting the tube 1. Arrow A indicates the adjustment direction of the disk milling cutters 2 in the first axial direction for setting the cutting depth of the disk milling cutters 2. Arrow B indicates the movement of the disk milling cutters 2 in the second axial direction. In the embodiment shown in FIG. 2, the four supports 7 are synchronously driven in the second axial direction by a single advance motor 12.

A plurality of clamping devices 54 (not shown) secure the tube 1 within the frame 6.

FIG. 2 also depicts a partial variety of tube profiles which can be cut by a machine configured in accordance with the present invention. A large and small circular tube, 60 and 62, respectively, a rectangular tube 64 and a square tube 66, are shown.

In operation, a tube 1 is secured within the frame 6 by clamping devices 54. Each disk milling cutter 2 is adjusted in the first axial direction to set the desired cutting depth. The linear advance drive motor 12 drives the bevel gear 11 of a single threaded rod 10 thereby transferring the rotational movement of the drive 12 to synchronous linear movement of all four supports 7 and disk milling cutters 2. The tube 1 is cut simultaneously at four circumferential locations as the supports 7 and disk milling cutters 2 move in synchronous linear fashion and at right angles to each other along the guide strips 8.

Figure 3:
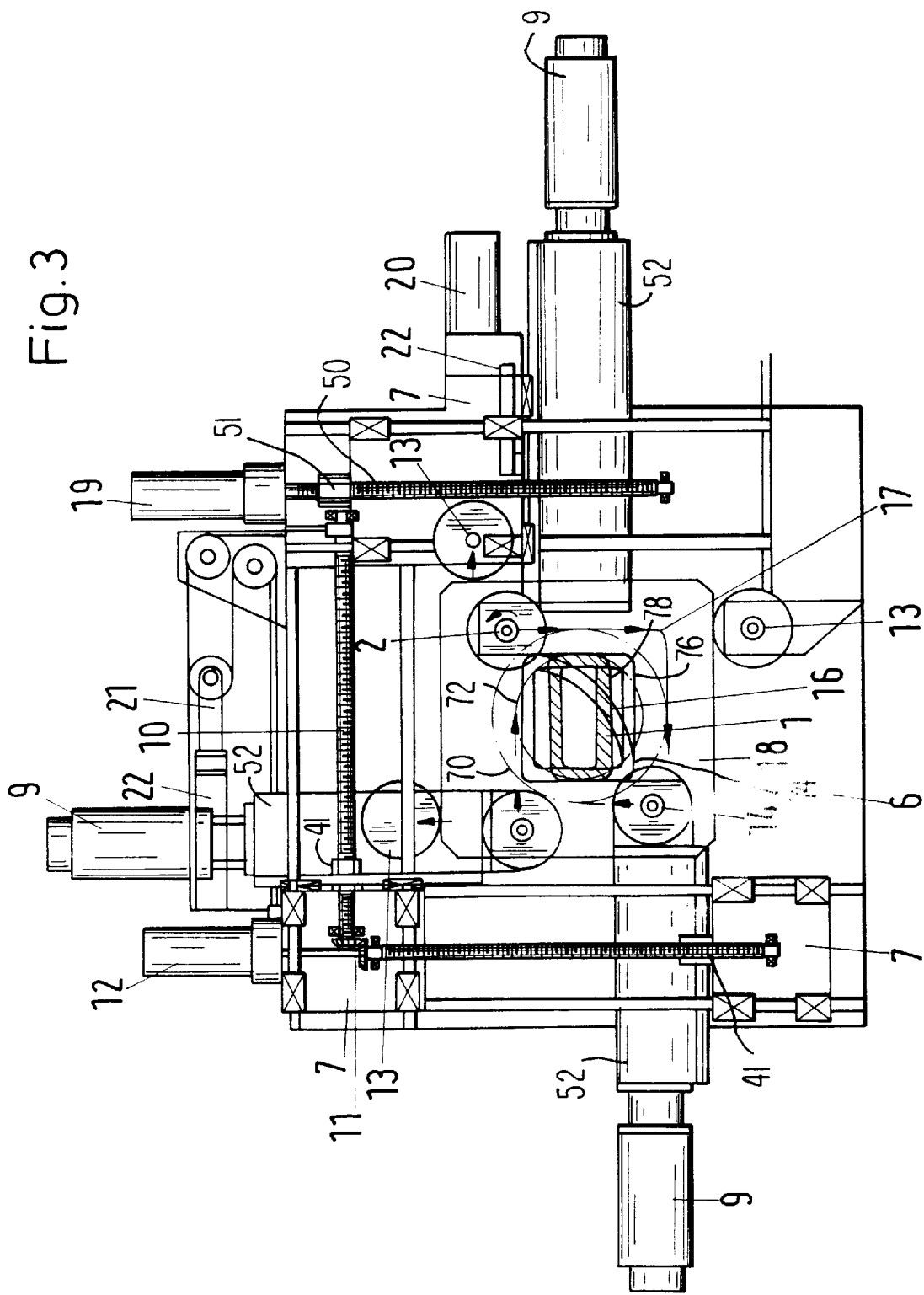
FIG. 3 is a view of a machine for cutting tubes having three disk milling cutters and configured in accordance with the present invention.

FIG. 3 depicts a machine configured in accordance with the present invention particularly suitable for cutting tubes with triangular cross-sections. The machine depicted in FIG. 3 can also cut tubes with round, square, and rectangular cross-sections. A plurality of guide strips 8 are provided on a frame 6 which encompasses the tube 1. Three supports 7, stacked in two vertically axial directions on the frame 6, are carried by the guide strips 8 for linear movement thereon. The supports 7 are moveable along the guide strips 8 at right angles to each other on a plane that runs at a right angle to the longitudinal axis of the tube.

Mounted to each support 7 is a cutting head 52 having a disk milling cutter 2 attached thereto. Each disk milling cutter 2 is driveable radially via a drive motor 9. Each disk milling cutter 2 is also separately adjustable in a first axial direction generally inward toward the tube 1. This adjustment will set the cutting depth of the disk milling cutter 2 as it cuts through the tube 1.

Two threaded rods 10 are provided, each having a bevel gear 11 connected to an end thereof. The bevel gears 11 interlockingly engage each other such that rotational movenment imparted to one bevel gear 11 will cause corresponding rotational movement to the other bevel gear 11. Of course, as the bevel gears 11 rotate, so to do the threaded rods 10 connected thereto. The threaded rods 10 are disposed at a right angle to each other.

Two supports 7 have a threaded piece 41 which threadedly engages a threaded rod 10. A single linear advance drive motor 12 is connected to one of the bevel gears 11 and consequently synchronously drives two of the supports 7. Accordingly, only two supports 7 are connected to one another via threaded rods 10 and bevel gears 11, i.e. only two supports 7 are synchronously moved in the cutting or second axial direction by the same advance motor 12.

The third support 7 is driven by two separate advance motors 19, 20. Advance motor 19 moves the support 7 and disk milling cutter 2 along the guide strip 8 in a generally vertical direction. Advance motor 20 moves the disk milling cutter 2 in a generally horizontal direction. The linear movement imparted on the third support 7 and disk milling cutter 2 from the linear advance motor 19 is superimposed on the linear movement from linear advance motor 20 resulting in a non-linear movement of the disk milling cutter 2. This machine is therefore suitable for cutting tubes having triangular cross-sections as the movement of the support 7 and disk milling cutter 2 will follow the contour of the outer surface of the tube 1. The speeds of the drive motor 9 and advance motors 19, 20 for the third support 7 can be controlled independently of the drive motor 9 and advance motor 12 of the other two supports 7.

All three supports 7 are connected via a pulley system 21 to a pressure cylinder 22, which ensures proper weight balance during movement of the supports 7.

FIG. 3 also depicts a partial variety of tube profiles which can be cut by a machine configured in accordance with the present invention. A large and small circular tube, 70 and 72, respectively, a triangular tube 74, a square tube 76, and a rectangular tube 78, are shown.

In operation, a tube 1 is secured within the frame 6 by a plurality of clamping devices 54 (not shown). The cutting depth of two adjacent disk milling cutters 2 is set by moving the disk milling cutters generally inward toward the tube 1 in the first axial direction. Two adjacent supports 7 and disk milling cutters 2 are synchronously moved in the second axial or cutting advance direction, linearly and at right angles with respect to each other. The third support 7 and disk milling cutter 2 is moved along a non-linear path as a result of the superimposition of the orthogonal linear movement transferred to the support 7 from the linear advance drives 19 and 20. When cutting a triangular tube 74, the third disk milling cutter 2 follows the non-linear contour of the exterior surface of the tube. In a single movement, a single disk milling cutter 2 is able to cut a tube along a non-linear path. Alternatively, when cutting rectangular, square or circular tubes, the third disk milling cutter 2 is able to cut two sides (for rectangular and square tubes) or one-half the circumference (for round tubes) due to the cooperation between the linear advance drives 19 and 20.

Figure 4:
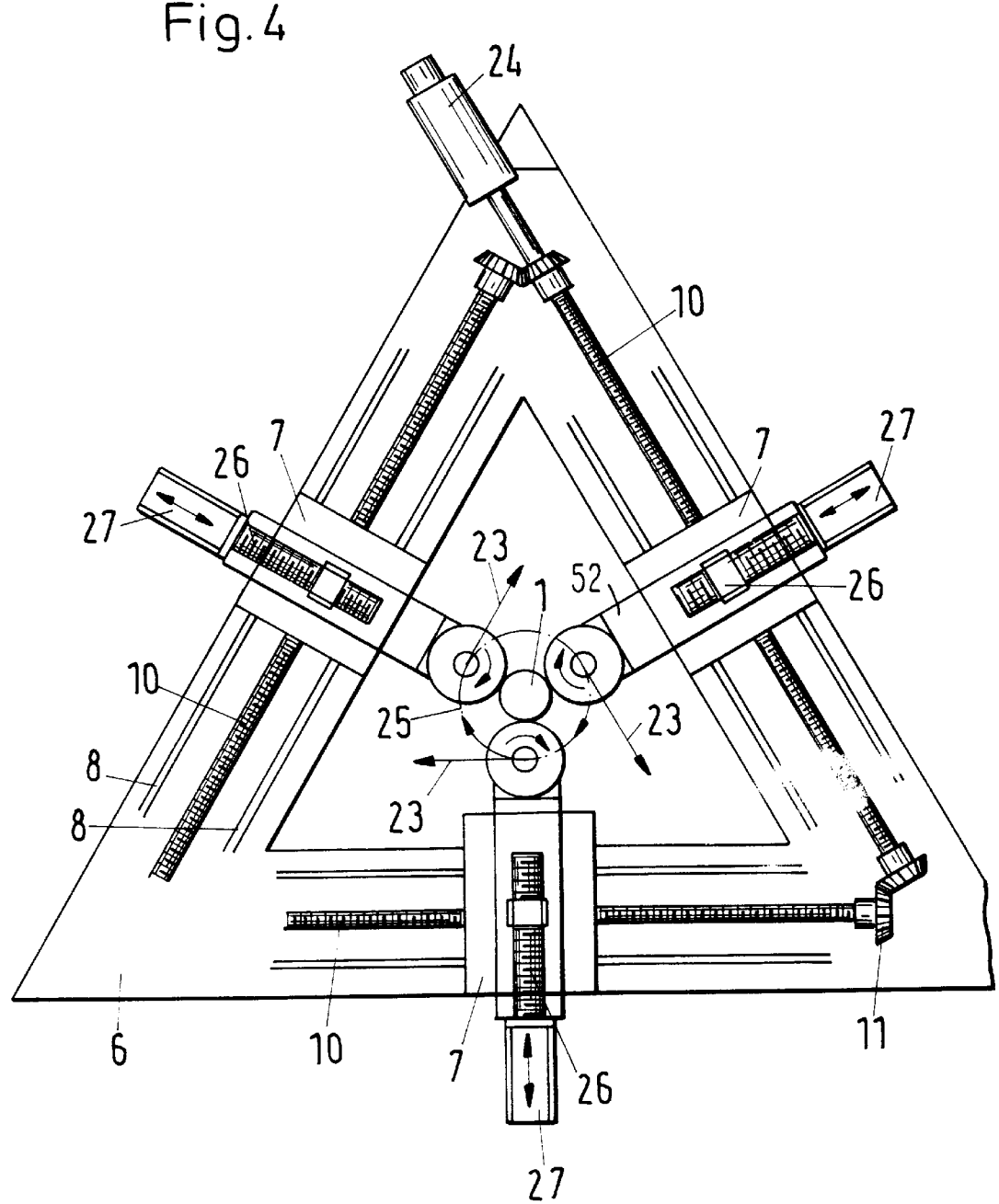
FIG. 4 is a view of a machine for cutting tubes having a substantially triangular frame and three disk milling cutters, configured in accordance with the present invention.

FIG. 4 depicts a tube cutting machine configured in accordance with the present invention having a substantially triangular frame 6. In this embodiment, the guide strips 8 for the three supports 7 run toward one another at an acute angle. The cutting direction of the supports 7 is identified by arrows 23. A plurality of threaded rods 10 are provided which have bevel gears 11 connected at opposite ends thereof. The bevel gears 11 interlockingly engage each other to connect the threaded rods 10 in substantially triangular serial fashion. A single drive motor 24 is connected to one bevel gear 11 and synchronously drives the plurality of threaded rods 10. In response, the supports 7 move linearly along the guide strips 8 so that each support 7 essentially moves away from the adjacent support 7, e.g. in a clockwise or counter-clockwise direction, during cutting of the tube 1. Each support 7 is provided with a separate advance motor 27, which via a screw 26, moves the disk milling cutter 2 generally inward toward the tube 1 at a right angle to the guide 8 to set the cutting depth of each disk milling cutter 2. The advance motors 27 may also be synchronized with each other so that the synchronized linear movement of the supports 7 by the drive motor 24 is superimposed on the synchronized linear movement of the disk milling cutters 2 by the advance motors 27 thereby converting the straight-line movement directions of the supports 7 and disk milling cutters 2 into a generally circular movement, indicated by the arrow 25.

In an alternative embodiment, a plurality of drive motors 24 may be provided, one for each support 7, which are electrically coupled to one another to provide synchronous movement of the supports 7 in the cutting direction. Recirculating ball screws 70 (not shown) separately couple each support 7 to a drive motor 24.

In operation, a tube 1 is secured within the frame 6 by a plurality of clamping devices 54 (not shown). As the drive motor 24 moves the supports 7 and disk milling cutters 2 linearly along the guide strips 8, the advance motors 27 synchronously move the disk milling cutters 2 generally inward toward the tube 1. The two linear movements are superimposed on each other effecting a generally circular movement of the disk milling cutters 2 as the tube 1 is cut.

The invention is not limited by the embodiments described above which are presented as examples only but can be modified in various ways within the scope of protection defined by the appended patent claims.

What is claimed is:

1. An apparatus for cutting a tube having a longitudinal axis, the apparatus comprising:

a frame for encompassing the tube;

at least three supports supported on said frame in two vertically stacked axial directions, said supports being disposed adjacent one another in distributed fashion about the tube on a single plane and at a right angle to the tube longitudinal axis, said supports being moveable axially;

at least one cutting head mounted on each of said supports;

a disk milling cutter mounted to each said cutting head, each of said disk milling cutters being rotatable on a common cutting plane so as to cut through the tube when said supports are moved axially, said disk milling cutters being moveable in the same direction relative to the circumference of the tube such that each of said disk milling cutters simultaneously cuts a section of the wall cross-sectional area of the tube;

a plurality of clamping devices arranged on said frame for securing the tube during the cutting process; and wherein at least two of said supports are driveable exclusively in a single axial direction during cutting of the tube.

2. The apparatus of claim 1, wherein said supports are synchronously driveable in a straight line at a constant speed.

3. The apparatus of claim 1, wherein said at least three supports includes a fourth support supported on said frame and wherein said four supports are adjustable in a first axial direction and wherein said four supports are movable in a second axial direction, said second axial direction of adjacent supports running at right angles to one another.

4. The apparatus of claim 3, further comprising a plurality of advance motors for moving said supports in said second axial direction, said plurality of advance motors being linked synchronously in pairs.

5. The apparatus of claim 1, wherein said three supports are adjustable in a first axial direction and are movable in a second axial direction, at least two of said three supports being adjacent one another, whereby said second axial directions of said at least two adjacent supports run at right angles to one another and whereby at least the third support of said three supports is movable along a non-linear path.

6. The apparatus of claim 1, wherein said frame is substantially triangular, said three supports being adjustable in a first axial direction and are synchronously movable in a second axial direction, said second axial directions of said three supports running toward one another at an acute angle.

7. The apparatus of claim 6, further comprising:
a drive motor; and
a plurality of bevel gear teeth interlockingly connecting said supports, at least one of said plurality of bevel gear teeth being connectable to said drive motor for synchronously moving said three supports in said second axial direction.

8. The apparatus of claim 6, further comprising:
a plurality of drive motors for moving said three supports in said second axial direction; and
means for providing synchronous movement of said three supports in said second axial direction.

9. The apparatus of claim 8, wherein said synchronous movement means comprises a plurality of recirculating ball screws having bevel gear teeth.

10. The apparatus of claim 1, wherein said frame is three-dimensional and substantially polygonal in cross-section and wherein said supports are removeably attached to said frame.

11. The apparatus of claim 1, wherein said disk milling cutter is removeably attached to said support.

* * * * *